May 27, 1924.

C. W. OLSON

FLYING MACHINE

Filed Dec. 9, 1921

Inventor
CARL W. OLSON

By Paul & Paul
ATTORNEYS

May 27, 1924.
C. W. OLSON
FLYING MACHINE
Filed Dec. 9, 1921
1,495,641
5 Sheets-Sheet 4
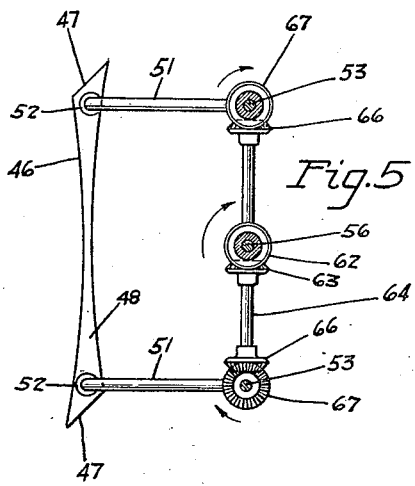
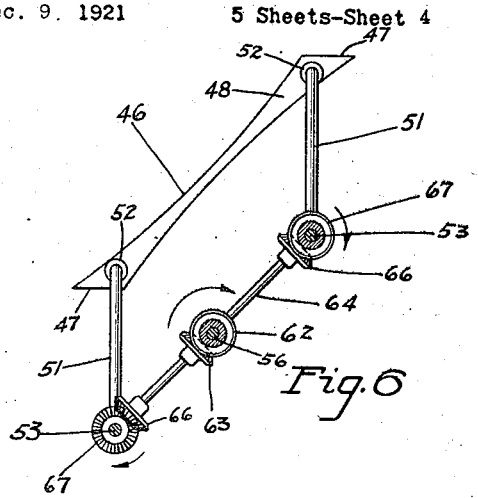
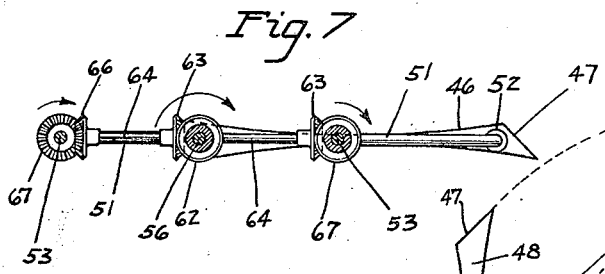
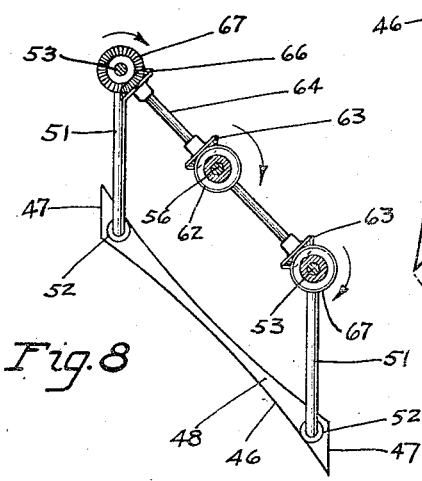
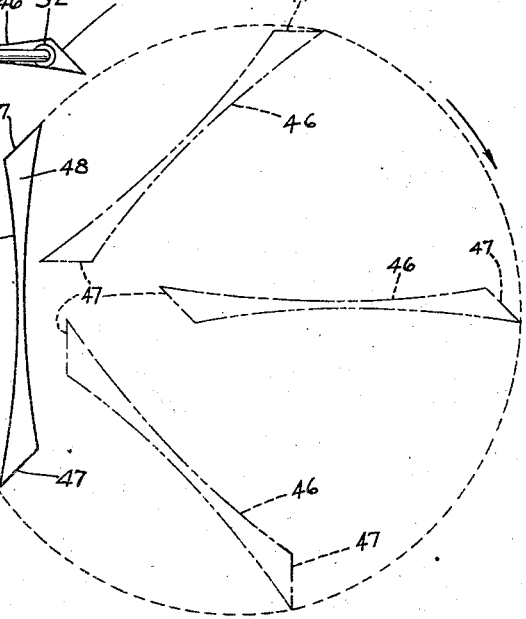
Inventor
CARL W. OLSON
By Paul & Paul
ATTORNEYS May 27, 1924.

C. W. OLSON 1,495,641

FLYING MACHINE

Filed Dec. 9, 1921

Inventor
CARL W. OLSON

By Paul & Paul
ATTORNEYS

Patented May 27, 1924.

1,495,641

UNITED STATES PATENT OFFICE.

CARL WILLIAM OLSON, OF MINNEAPOLIS, MINNESOTA.

FLYING MACHINE.

Application filed December 9, 1921. Serial No. 521,237.

*To all whom it may concern:*

Be it known that I, CARL W. OLSON, a subject of the Kingdom of Sweden, resident of Minneapolis, county of Hennepin, and State of Minnesota, have invented certain new and useful Improvements in Flying Machines, of which the following is a specification.

This invention relates to new and useful improvements in flying machines of the class generally known as heavier-than-air. More particularly this invention provides such a machine adapted not only for horizontal or inclined flight but also for perpendicular flight. Furthermore, this present invention is adapted to permit such a machine to remain stationary with respect to the air or to remain in the air and stationary above a given ground objective.

Broadly this invention comprehends the employment of revoluble wings or planes attached to a body structure and adapted upon their working strokes downwardly to thrust air with the resultant upward lifting or sustaining force acting upon the machine. The wings are so constructed and operated that upon their upward or non-working travel, they are "feathered" with consequent reduction of air resistance thus tending to minimize power losses and more particularly to tend to minimize any resultant downward force acting upon the machine. It may be further noted that the wing movements are rotatory and vibration and losses attendant upon reciprocatory motion are eliminated. In conjunction with these lifting and sustaining wings there is also employed a common type of propellor to provide a means for the forward flight of the machine while the usual rudders and elevators are also employed particularly to control forward flight in the usual manner.

The wings are preferably symmetrically formed and are actuated by a link motion to revolve about an axis outside of the plane of the wing while the wings are simultaneously rotated by the link motion to effect the desired feathering function. This is carried out by causing the wings to make a half rotation during one complete revolution about the above-mentioned axis.

The object therefore of the invention is to provide an improved machine.

Other objects of the invention will more fully appear from the following description and the accompanying drawings and will be pointed out in the annexed claims.

In the accompanying drawings there has been disclosed a structure designed to carry out the objects of the invention, but it is to be understood that the invention is not confined to the exact features shown, as various changes may be made within the scope of the claims which follow.

In the drawings:

Figure 5 is a view in end elevation showing one of the wings and links during upward non-working travel and illustrating the feathering action;

Figure 6 is a view similar to that of Figure 5 but showing the wing when initiating its downward working travel in its cycle of movements;

Figure 7 is a similar view of the wing at a later stage when horizontally extended;

Figure 8 is a similar view of the wing at a still later stage when its working travel has just been completed and preparatory to non-working feathering travel;

Figure 9 is a diagrammatic view illustrating the cycle of operations of a wing, the position assumed in Figure 5 being shown in full lines while those of Figures 6, 7 and 8 being shown in dotted lines;

Figure 1:
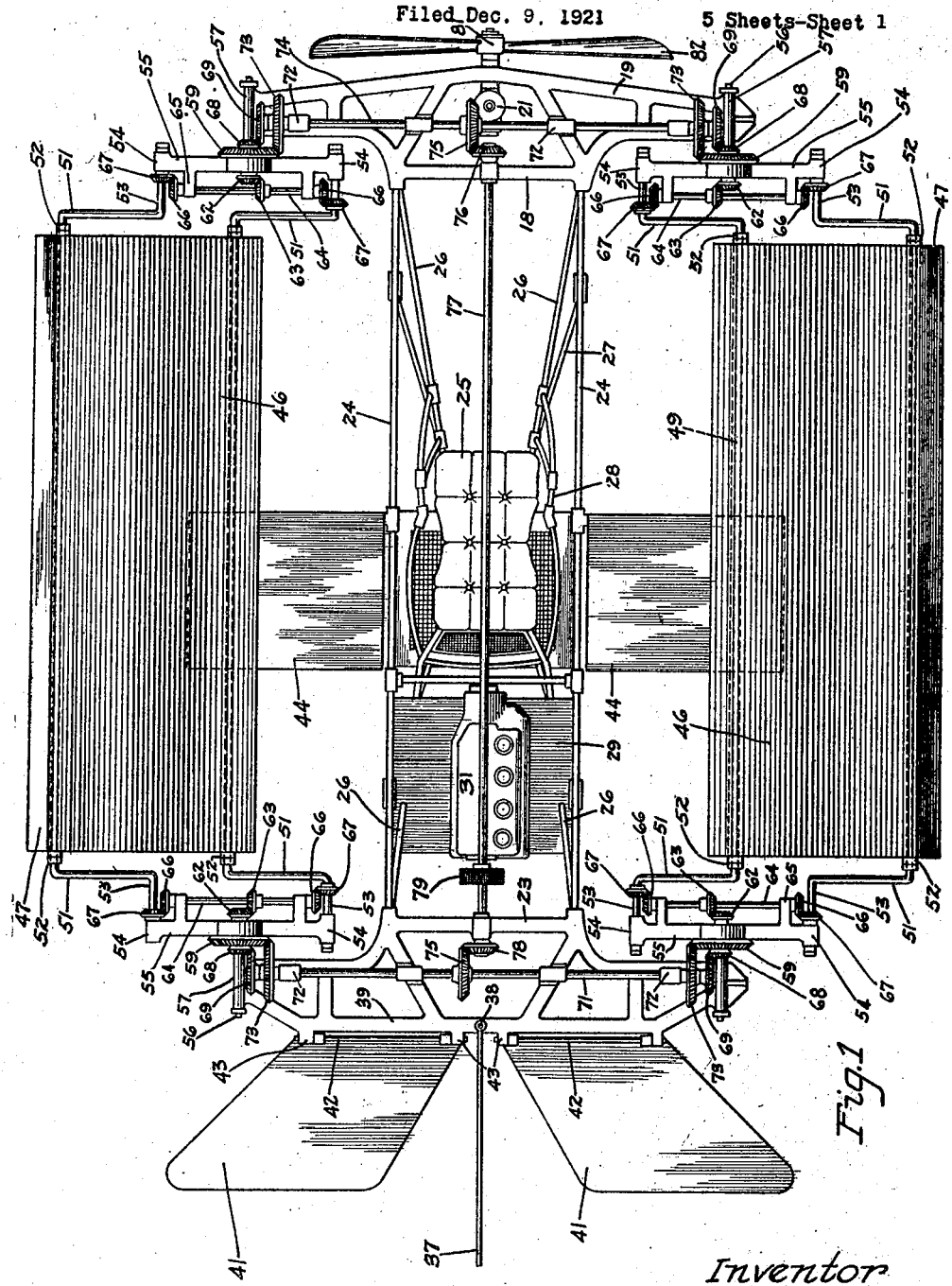
Figure 1 is a plan view of a flying-machine embodying the invention.

In the selected embodiment of the invention here shown, there is disclosed a body formed of tubular metallic members to assure lightness, strength and rigidity. Preferably, the base is rectangular and formed of two beams 12 terminally coupled to the cross-beams 13 at the front and rear of the machine. The two front uprights 14 and the two rear uprights 15 are respectively secured to the beams and cross-beams at the corners by means of the T-shaped couplings 16. The upper ends of the front uprights 14 are terminally received within the bosses 17 of a metallic frame 18 having a bar 19 extending laterally beyond each side of the rectangular base. The bar 19 is preferably integral with the frame 18 which carries a suitable base for the propeller engine 21 which need only be diagrammatically represented. The engine-supporting frame 18 is preferably also provided with integral struts 22 fixed to the forward uprights 14.

The upper ends of the rear uprights 15 similarly are connected to a frame 23 which provides bearings for the rear transmission. The two upper beams 24 longitudinally extend and are connected to the front frame 18 and the rear frame 23 and thus complete the main body of the machine. An operator's seat 25 is carried by the forward and rear struts 26 fixed to the forward and rear uprights and by the supports 27 fixed to the beams 12 of the body. The rails 28 provide a suitable guard for the operator. The base 29 for the rear or wing-driving engine 31 is carried by the engine frame 32 secured to the upper beams 24 of the rear seat struts 26 and the rear uprights 15. As here shown, there are preferably provided two engines of the usual internal combustion type suitable for aircraft work. One engine functions to turn the propeller while the other functions to actuate the wings. The usual controls for governance of engine operation are omitted in the drawings as too-well-known to those skilled in the art to merit illustration and description, it being sufficient to state that they are capable of independent engine operation.

The landing gear here shown is that adapted for land work and it is obvious that the machine may be readily adapted for water-landing in accordance with present common practice whether by hull or pontoon. As here shown axles terminally project laterally from the front cross-beams 13 and wheels 33 are mounted thereon, while at the rear of the body is journaled a single tail wheel 34 upon an axle carried by the extensions 35 and the braces 36.

Figure 2:
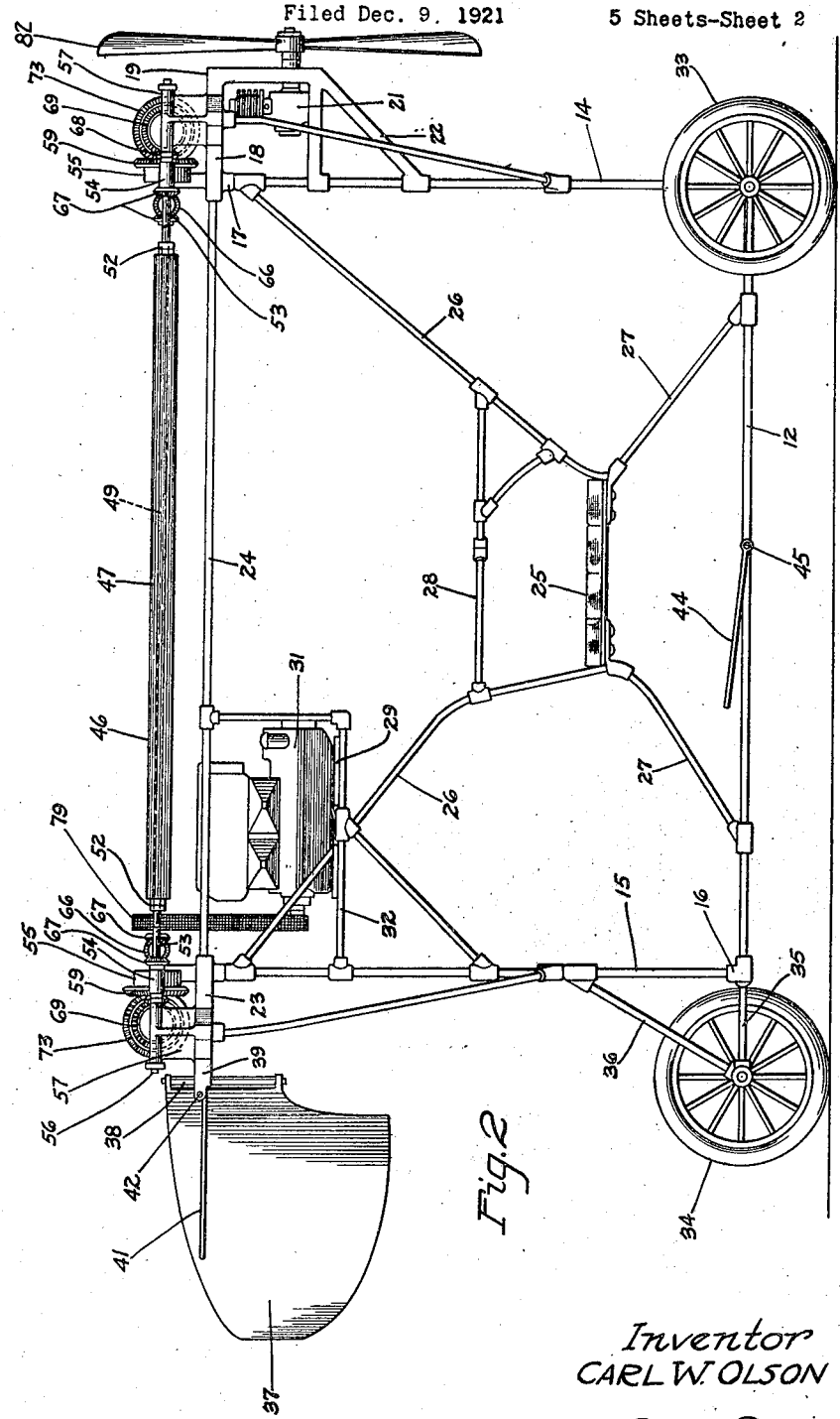
Figure 2 is a view in side elevation of the machine shown in Figure 1.
Figure 3:
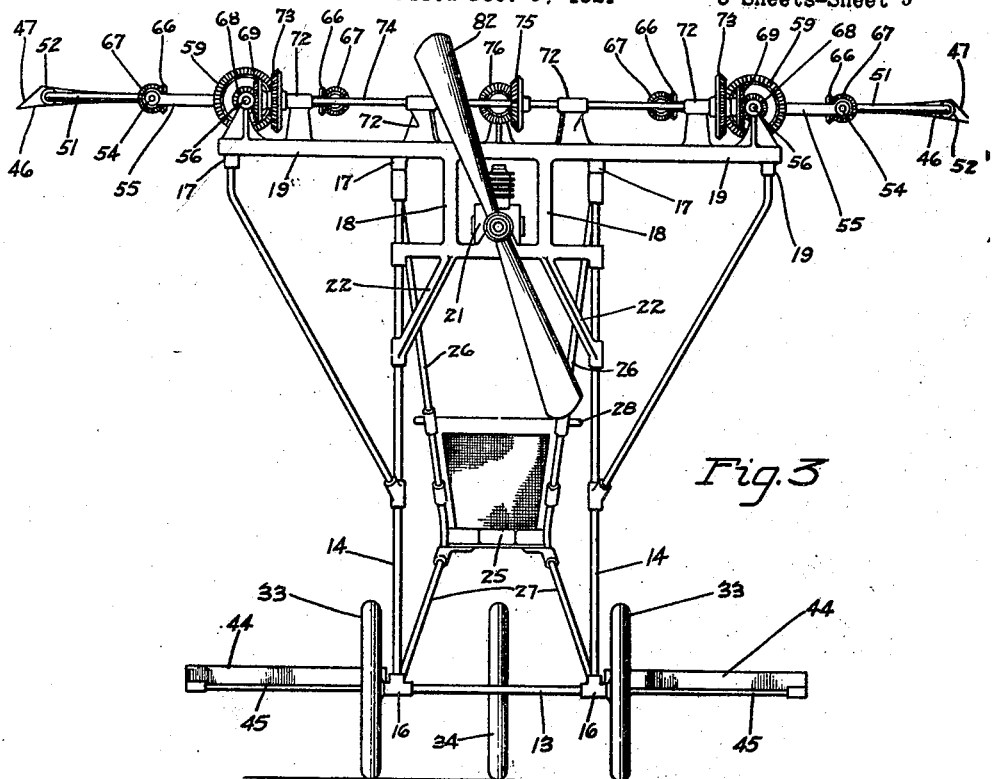
Figure 3 is a view of the same machine in front elevation.

This novel machine is also provided with the usual rudders for lateral change of direction, the elevators for change of horizontal direction, and stabilizers for lateral balance. The rudder 37 is secured to the rudder-port 38 pivotally borne by the bar 39 of the rear frame 23. This bar 39 similarly to the front bar 19 laterally extends beyond the main body of the machine to carry the bearings for the wing operating mechanisms. The usual elevators 41 are affixed to the transversely disposed post 42 pivotally borne in the bearings 43 provided by bosses on the bar 39. The stabilizers 44 are fixed at their leading edges to rods 45 laterally extending from and pivotally carried by the base beams 12 as shown in Figure 2. The controls for these three direction and balance-controlling members are made in accordance with common practice and need not be shown as one skilled in this art may readily rig such controls.

The preferred type of wing employed is one formed symmetrically with respect to its longitudinal axis. The wings 46 are similar and but one need be described. Of the usual fabric-covered construction, the leading edge 47 is a rearwardly inclined substantially plane surface while the two transverse working surfaces of the wing are concave. The wings are elongated as best shown in the plan view Figure 1 and are operably borne at each side of the machine to revolve about an imaginary axis and simultaneously to rotate.

The wings are so mounted and actuated that they complete one revolution to each half rotation whereby the desired feathering function is attained. The wing structure is preferably of the common strut type wherein the struts are of a light metal such as duraluminum while end plates 48 are provided at the front and rear ends of each wing. These plates 48 cooperably function as bearing plates for each of the two rods 49 which extend longitudinally through the wings adjacent their outer and inner edges. Such rods 49 are shown in dotted lines in Figure 1 and in cross-section in Figure 11. These rods 49 are substantially U-shaped with the straight portions extending longitudinally through the wings forming the elongated base of the U while the angularly projecting arms 51 form the sides of the letter in question. A plurality of bosses 52 are provided on each plate 48 through which the rods project and which form bearings as there is relative rotatory motion between the rods and the wing plates.

Figure 4:
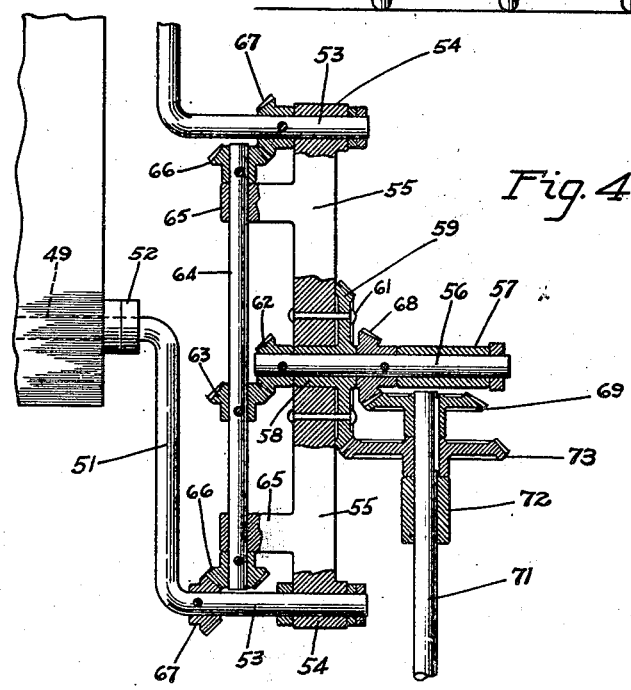
Figure 4 is a detailed view, partly in section, showing the power transmission to the links of the wings.

Each arm 51 has a terminally bent bearing-portion 53 which is parallel to its integral rod 49. As is shown in detail in Figure 4, each bearing-portion is rotatably journaled in a bearing 54 provided by the bearing head 55 which in turn is carried by and is rotatable with the stud shaft 56 rotatable in bearings provided by the blocks 57 preferably integral with and upwardly projecting from the rear frame. The bearing head 55 is centrally apertured to receive therethrough the hub 58 of the bevel gear 59. The bearing head 55 is fixedly secured to the bevel gear 59 by means of the plurality of double headed rivets 61. The hub 58, thus carrying with it the bearing head 55, is loosely mounted upon the stud shaft 56. A bevel gear 62 is pinned to the forwardly terminal portion of this stud shaft and meshes with a bevel pinion 63 pinned to the transverse shaft 64 rotatable in bearings formed by spaced integral brackets 65 projecting from the head 55. This shaft 64 has pinned thereto the similar terminal bevel gears 66 which respectively mesh with pinions 67 similarly pinned to the bent bearing-portions 53 of the two wing rods 49.

The stud shaft 56 has pinned thereto, adjacent the loosely mounted gear 59, a bevel pinion 68 which meshes with the bevel gear 69 keyed to the rear counter-shaft 71. This counter-shaft extends substantially across the rear end of the machine and is rotatably borne by a plurality of integral bearing brackets 72 upwardly projecting from the rear frame 23 of the machine. Adjacent each gear 69 on the rear counter-shaft 71 is keyed a bevel gear 73 which is arranged to mesh with and drive the bevel gear 59 whereby the bearing head 55 is rotated from the counter-shaft 71.

The bearing heads 55 and associated bevel gears, pinions and bearings are substantially duplicated at the front end of the machine and in the drawings are respectively designated by similar numerals with the exception of the front counter-shaft 74 rotatably borne by the brackets 72 integral with the front frame 18. Each of the front and rear counter-shafts 74 and 71 has fixedly secured thereto and therefore rotatable therewith a driven bevel gear 75. The front gear 75 meshes with and is driven by a bevel pinion 76 fixed to the front end of the main power shaft 77 which extends longitudinally of the machine above the operator's seat 25. The pinion 78 is similarly secured to the rear end of the main power shaft and actuates the rear driven gear 75 fixed to the rear counter-shaft. Power is conveniently transmitted to the power-shaft 77 by means of the chain 79 driven by the crank-shaft of the rear or wing engine 31.

The crank-shaft of the propeller engine 21 forwardly projects and has the hub 81 of the usual airplane propeller 82 fixed thereto.

In operation of the machine, the wing engine 31 drives the power shaft 77 which synchronously actuates the two counter-shafts 71 and 74 at the same number of revolutions per minute through the driven bevel gears 75. The counter-shafts function to rotate the bearing heads 55 at the same R. P. M. through the gears 73 and 59, while simultaneously the four transverse shafts 64 of the machine are rotated at a rate which is twice the R. P. M. of the bearing heads 55. These four transverse shafts 64 in turn rotate the eight bent bearing-portions 53 of the wing rods 49 at twice the R. P. M. of the bearing heads 55. The result of such timed actuation of the bearing heads 55 and portions 53 is that the wings 46 effect a half-rotation during one complete revolution about the axis of the stud shafts 56. Thus, as is indicated in Figures 5-9 inclusive, the desired feathering action of the wings is attained. In Figure 5, a wing is shown in vertical position whereat the wing is presented edgewise to the travel of the wing and air-resistance is minimized. At such position, the arms 51, which function substantially as a link motion, are at right angles to the transverse shafts 64. In Figure 6, the wing is shown at a subsequent position in its cycle whereat the arms 51 are inclined with relation to the shafts 64 and the wing is outwardly projected and initiating its downward thrust upon the air with the resultant upward lifting force thus communicated to the bearing heads 55. A later position is illustrated in Figure 7 wherein the wing upon its working travel is shown in fully extended transverse position whereat its greatest lifting force is attained. Figure 8 indicates a position after the sweeping working travel of the wing whereat the wing travels toward the side of the machine and is turned edgewise to cause its pointed leading edge 47 to cut the air as the remainder of the wing area follows with air-resistance minimized. The utility of the inclined leading edge 47 of the wing is illustrated in the diagrammatic view in Figure 9. The term "leading edge" as here employed refers to that inclined longitudinally extending edge of the wing which, for the time being, is in advance of the remainder of the wing for, obviously, both edges so function at different periods in the cycle of operations of each wing.

Figure 10:
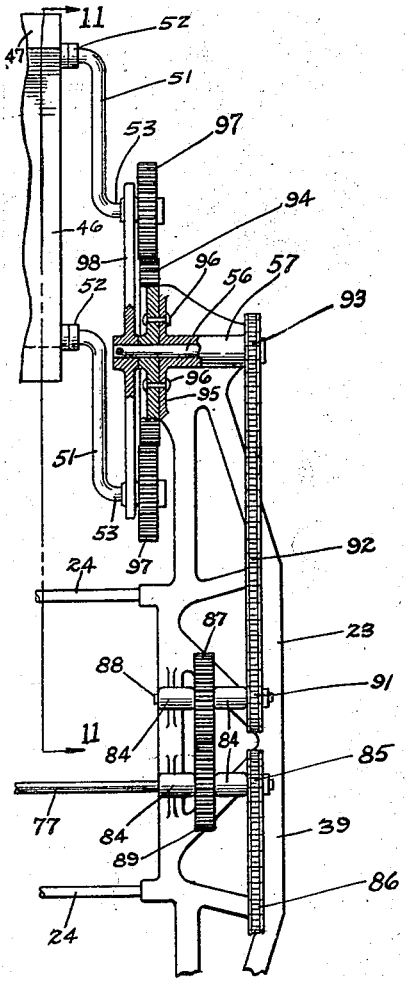
Figure 10 is a plan view of a modified form of chain and sprocket power transmission for the wings.
Figure 11:
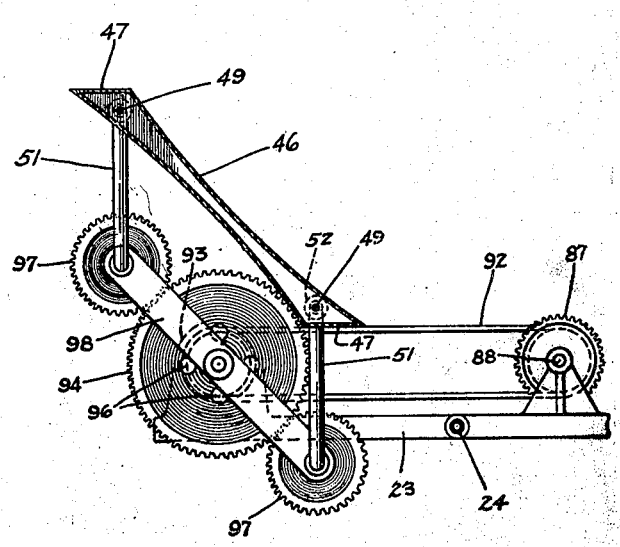
Figure 11 is a view in vertical section on the line 11—11 of Figure 10.

A modified form of power transmission is shown in Figures 10 and 11. Therein, a chain and sprocket transmission is illustrated in place of the previously described bevel gears. The power shaft 77, rotatably borne in spaced bearing brackets 84 on the rear frame 23, terminally bears a sprocket 85 fixed thereto over which passes a chain 86 to drive one wing end. The adjacent wing end is driven through a gear 87 keyed to a stub shaft 88 rotatably borne in spaced brackets 84. The gear 87 meshes with and is driven by a gear 89 fast on the power shaft 77. The shaft 88 of the driven gear 87 terminally bears fast thereon a sprocket 91 engaged by a chain 92 which at the other end of its travel engages a sprocket 93 fast on the stud shaft 56 borne by the bearing block 57 on the adjacent frame. The wing arms are actuated by an epicyclic gear train. A large gear 94 is fixedly secured to a flange 95 on the block 57 by means of a plurality of rivets 96. The pinions 97 are rotatably borne by the bearing head 98 adjacent the opposite ends thereof. The pinions mesh with diametrically opposed portions of the gear 94 and each pinion is pinned to a bearing portion 53 of the wing rods 49 similarly to the pinions 67 of the preferred form. Thus, the power shaft 77 may drive the stud shaft 56 thus rotating the bearing head 98. The head carries the diametrically opposed pinions 97 which are also rotated by their meshing engagement with the stationary gear 94.

Having thus described my invention, what I claim as new and desire to secure by Letters-Patent is:

1. A flying machine having a body, wings rotatably borne adjacent opposite sides of the body, rods rotatably mounted in each wing, one on each side of the axis of rotation of the wing, a bearing head rotatably mounted on the body adjacent an end of each wing, each rod being rotatably borne by opposed heads, and means relatively rotating said heads and rods.

2. A flying machine having a body, wings rotatably borne adjacent opposite sides of the body, rods extending through each wing upon opposite sides of the axis of rotation thereof, a bearing head rotatably mounted on the body adjacent each wing end, each rod having terminal bearing portions rotatably borne by opposed heads and substantially forming links, and means for relatively rotating said heads and bearing portions.

3. A flying machine having a body, elongated wings rotatably borne adjacent opposed sides of the body, rods longitudinally extending through each wing adjacent the margins thereof, a bearing head rotatably mounted on the body adjacent each wing end, said rods having offset terminal bearing portions rotatably borne by said heads and substantially forming links, means for relatively rotating said heads and said bearing portions whereby the wings are substantially horizontally extended during their downward working travel and are feathered during their upward return travel.

4. A flying machine having a body, elongated wings rotatably borne adjacent opposed sides of the body, a bearing head rotatably borne by the body adjacent each wing end, a pair of link members rotatably borne in spaced relation by each wing end and by the adjacent head, means for relatively rotating the head and links to cause the wings to make a half-revolution during a complete revolution of the head whereby the wings are substantially horizontally extended during their downward working travel and are feathered during their upward return travel.

5. A flying machine having a body, elongated wings rotatably borne adjacent opposed sides of the body, rods longitudinally extending through said wings, bearing portions provided on each end of said rods, said portions being offset from and parallel to said rods, a bearing head for each terminally adjacent pair of bearing portions, said heads being rotatably mounted on the body, and means for synchronously rotating said heads and said bearing portions at relatively different rates of speed whereby the wings are substantially horizontally extended during their downward working travel and are feathered during their upward return travel.

6. A flying machine having a body, elongated wings rotatably borne adjacent opposed sides of the body, a bearing head rotatably mounted on the body adjacent each wing end, members connecting each wing with its adjacent heads to permit each wing to rotate on its own median longitudinal axis and to revolve about the axis of its adjacent opposed heads, countershafts transversely extending adjacent each end of the body and rotatably borne thereby, means operably connecting each countershaft and the adjacent heads and wing-connecting members, and means synchronously to rotate both countershafts whereby the wings are substantially horizontally extended during their downward working travel and are feathered during their upward return travel.

7. A flying machine having a body, elongated wings rotatably borne adjacent opposed sides of the body, a bearing head rotatably mounted on the body adjacent each wing end, members connecting each wing with its adjacent opposed heads to permit each wing to rotate on its own median longitudinal axis and to revolve about the axis of its opposed heads, countershafts transversely extending adjacent each end of the body and rotatably borne thereby, means operably connecting each countershaft and the adjacent heads and wing-connecting members, a power shaft rotatably borne by the body, extending longitudinally thereof and having driving connection for synchronous rotation of each countershaft, and means to drive the power shaft whereby the wings are substantially horizontally extended during their downward working travel and are feathered during their upward working travel.

8. A flying machine having a body, elongated wings rotatably borne adjacent opposed sides of the body, a bearing bar rotatably mounted on the body at each end of each wing, each bearing bar being rotatably mounted at its center point on the body, a pair of link members connecting each wing end and the adjacent bearing bar, the link members being rotatably borne by the wing ends and bearing bars in spaced relation, means to rotate the bearing bars and link members whereby each wing rotates on its own median longitudinal axis and revolves about the axis of its complementary opposed bearing bars so that the wings are substantially horizontally extended during their downward working travel and are feathered during their upward return travel.

In witness whereof, I have hereunto set my hand this 7th day of December, 1921.

CARL WILLIAM OLSON.